May 21, 1968  J. T. SCHULLER  3,384,266
DROP SHELF ARTICLE DISPENSING APPARATUS
Filed Jan. 11, 1967  6 Sheets-Sheet 1

James T. Schuller,
Inventor.
Koenig, Senniger,
Powers and Leavitt,
Attorneys.

May 21, 1968  J. T. SCHULLER  3,384,266
DROP SHELF ARTICLE DISPENSING APPARATUS
Filed Jan. 11, 1967  6 Sheets-Sheet 2
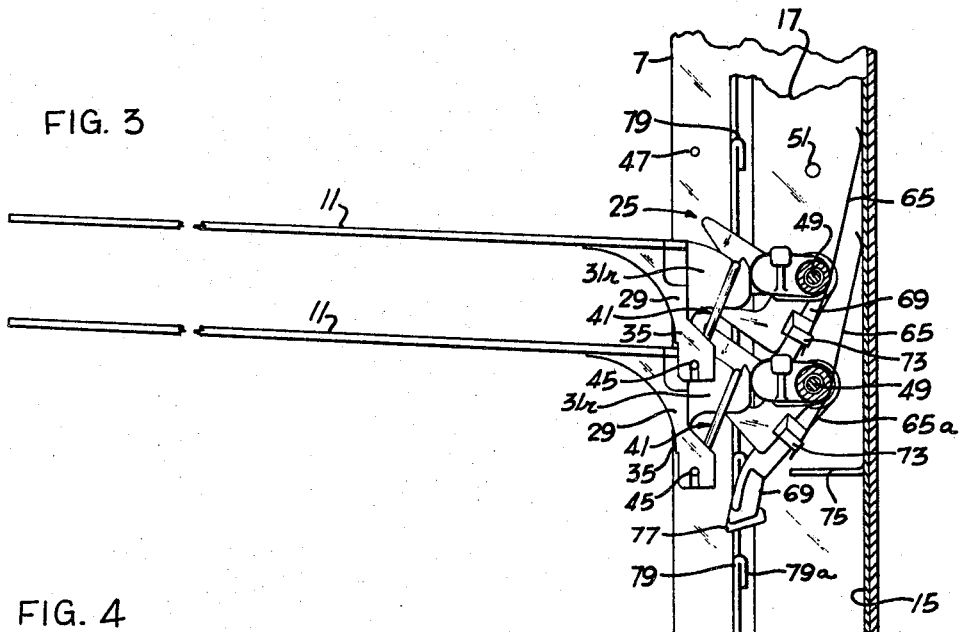
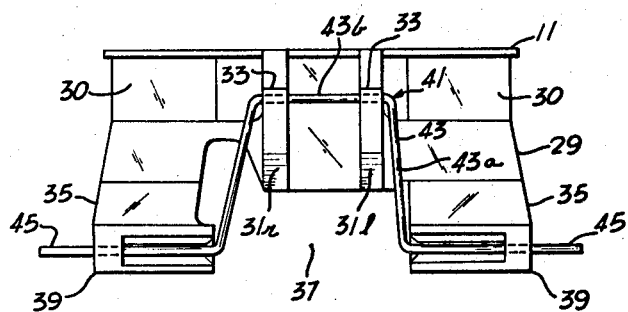
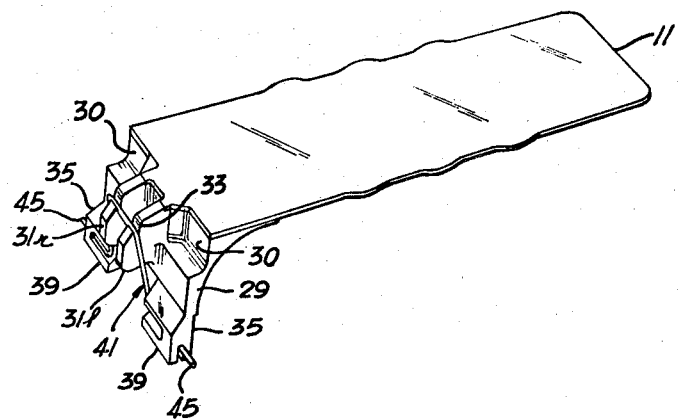

May 21, 1968  J. T. SCHULLER  3,384,266

DROP SHELF ARTICLE DISPENSING APPARATUS

Filed Jan. 11, 1967  6 Sheets-Sheet 3

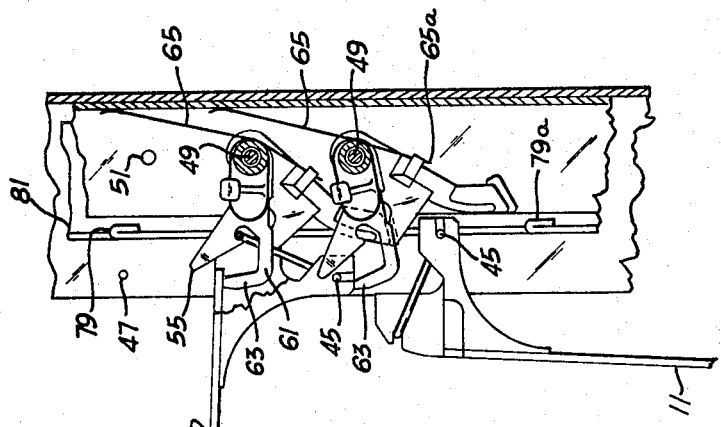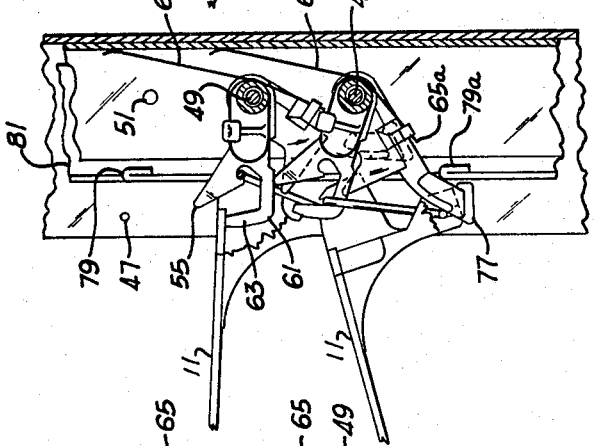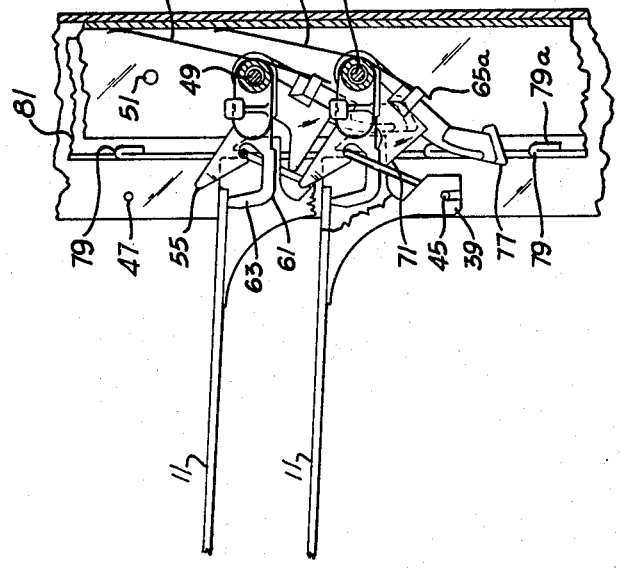

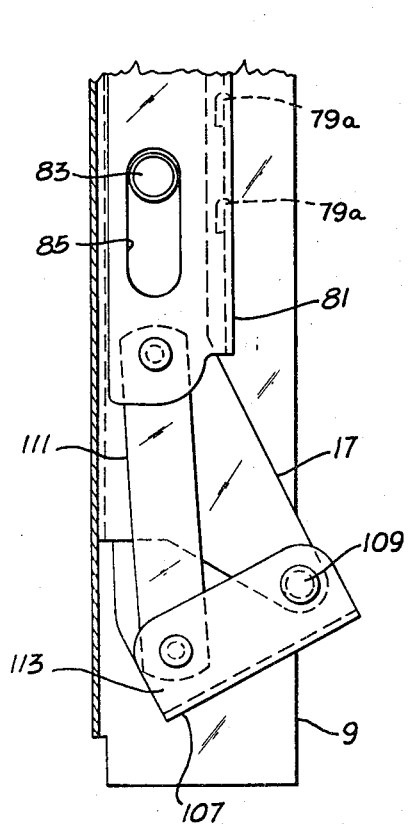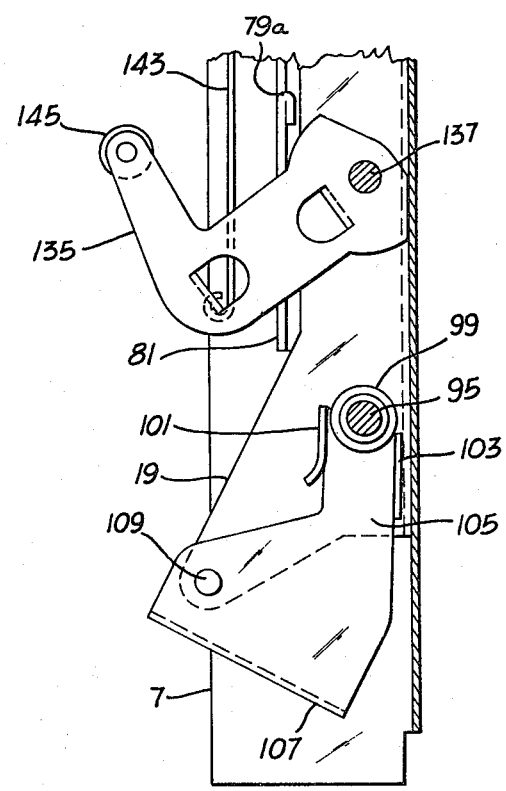
FIG. 13
FIG. 14

United States Patent Office 3,384,266
Patented May 21, 1968

3,384,266
DROP SHELF ARTICLE DISPENSING APPARATUS
James T. Schuller, St. Ann, Mo., assignor to UMC Industries, Inc., St. Louis, Mo., a corporation of Delaware
Filed Jan. 11, 1967, Ser. No. 608,623
8 Claims. (Cl. 221—90)

ABSTRACT OF THE DISCLOSURE

An article dispensing apparatus of the drop-shelf type, having a series of pivoted shelves located one above another, and mechanism for latching the shelves in a generally horizontal article-carrying position and for successively releasing the shelves, starting with the bottom shelf, on successive vend cycles, for successively vending articles from the bottom shelf on up.

Background of the invention

The invention pertains to article dispensing apparatus of the drop-shelf type, as noted in the above abstract, of the type such as shown in the prior coassigned U.S. Patents 2,896,817 issued July 28, 1959, and 2,956,707, issued Oct. 18, 1960, such as are used in candy vending machines. Drop-shelf columns such as shown in these patents, particularly 2,896,817, have had considerable commercial success, but have presented a problem as regards capacity of a column, noting that the height of the columns is restricted in accordance with the height of the vending machine cabinets which are conventionally used. Another problem presented in this class of article dispensing apparatus has been that they involve relatively complex mechanism, requiring a considerable number of parts and hence requiring considerable assembly time on the assembly line.

Summary of the invention

The principal objects of this invention are the provision of an article dispensing apparatus of the drop-shelf type which is of improved construction such as to enable closer spacing of the shelves in a vending machine column for increased capacity, i.e., increase in the number of shelves and hence the number of articles that can be stocked in a column of given height, and the provision of such apparatus which, in addition to providing for increased capacity, is of simplified, more economical construction, involving fewer parts and reduced assembly time.

Briefly, an article dispensing apparatus of this invention comprises a series of latches, one for each of the shelves in a drop-shelf column, each latch being mounted on the shelf support of the column for movement into and out of latching engagement with a respective shelf, and being biased toward latching engagement with the respective shelf. For releasing the latches, there is provided a series of trips, one for each latch, each mounted on the support for movement toward and away from engagement with the respective latch and biased toward engagement with the respective latch. A release bar is carried by the support for vertical movement adjacent the trips. This bar has a series of vertically spaced trip-operating fingers, one for each trip, and means is provided for effecting vertical shifting of the bar away from and back to a retracted position. Each shelf below the top shelf, when latched in its article-carrying position, is engageable with the trip for the latch of the next shelf below to hold this trip in a retracted position clear of the respective trip-operating finger on the bar. Each trip above the lowermost trip, on release of the next shelf below, is biased toward an operative position wherein it is engageable by the respective trip-operating finger on the bar on the next actuation of the bar for movement by the bar to release the respective shelf. Other objects and features will be in part apparent and in part pointed out hereinafter.

Brief description of the drawings

FIG. 3 is an enlarged vertical section on line 3—3 of FIG. 2;

FIG. 4 is a view in elevation of the rear of a shelf per se;

FIG. 5 is a perspective of a shelf per se;

FIG. 10 is a fragment of FIG. 3 with parts broken away;

FIG. 11 is a view similar to FIG. 10 showing the lowermost shelf partly released;

FIG. 12 is a view similar to FIG. 11 showing the lowermost shelf fully released;

FIG. 13 and 14 are vertical sections on lines 13—13 and 14—14, respectively, of FIG. 2.

Corresponding reference characters indicate corresponding parts throughout the several views of the drawings.

Description of the preferred embodiment

Figure 6:
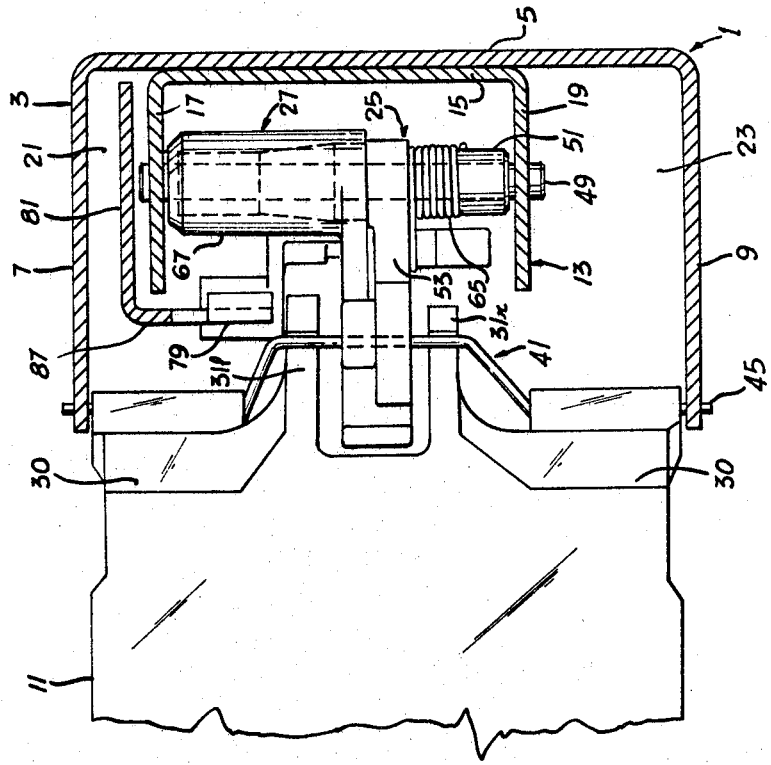
FIG. 6 is an enlarged horizontal section on line 6—6 of FIG. 1.
Figure 7:
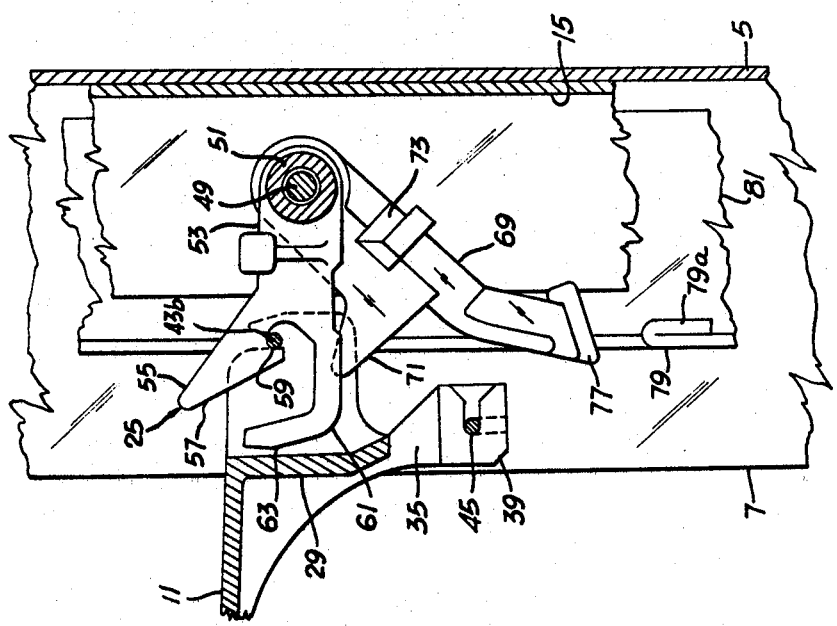
FIGS. 7 and 8 are enlarged detail sections showing one shelf and a latch and trip therefor, the shelf being shown latched in its article-carrying position, and the trip being shown in position for actuation to release the latch.
Figure 8:
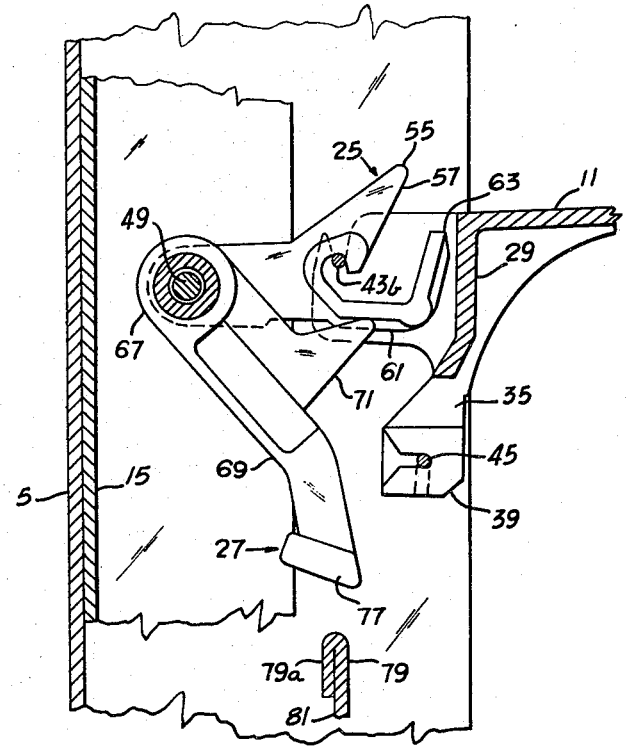

Referring to the drawings, a dispensing column of this invention is shown to comprise a vertical shelf, latch and trip support assembly, designated in its entirety by the reference numeral 1, and comprising a main vertical channel-section member 3 having a web 5 and left and right side flanges 7 and 9. The web 5 constitutes the back of the column as it is mounted in a vending machine, and the flanges 7 and 9 extend forward. The channel 3 constitutes a mounting for a plurality of pivoted article-carrying shelves 11, arranged in a vertical series, one above another. Within the channel 3, extending vertically thereof on the front face of web 5, is an auxiliary channel-section member 13 having a web 15 and left and right side flanges 17 and 19. This auxiliary channel is narrower than the main channel. Its web 15 is secured against the front face of web 5 as indicated at 20, and its flanges 17 and 19 extend forward within the main channel, with a space 21 between the left-hand flange 17 of the auxiliary channel and the left-hand flange 7 of the main channel, and a space 23 between the right-hand flange 19 of the auxiliary channel and the right-hand flange 9 of the main channel (see particularly FIG. 6). Flanges 17 and 19 are narrower (in front-to-rear direction) than flanges 7 and 9. The main channel constitutes a mounting for a series of latches 25, one for each shelf 11, and a series of trips 27, one for each latch.

The shelves 11 are all identical. Each shelf, which is preferably a one-piece plastic molding, has an integral downwardly directed formation at its rearward end comprising a flange 29. This flange has recesses 30 at its upper corners. Extending rearward from flange 29 are two spaced lugs 31*l* and 31*r*, molded as integral parts of the shelf. These are notched at 33. Legs 35, molded as integral parts of the shelf, extend down from flange 29 spaced laterally outward from the lugs, the recess between these legs being designated 37. Each leg is provided with a horizontal hinge eye formation 39 at its lower end. At 41 is indicated a hinge member constituted by a length of spring wire bent to have a loop portion 43 of inverted U-shape and horizontal hinge pin portions 45 which extend laterally outward from the lower ends of the sides 43a of the loop portion 43. The top 43b of the loop portion is lodged in the notches 33 in the lugs. The sides 43a of the loop portion extend downward on the outside of the lugs, being inclined downward and laterally outward, and the hinge pin portions 45 extend laterally outward from the lower ends of sides 43a of the loop portion through the hinge eyes 39 at the lower ends of the legs 35. The outer ends of hinge pin portions 45 normally project laterally outward beyond the legs as best shown in FIG. 4. By squeezing together the sides 43a of the loop portion 43, the hinge pin portions 45 may be retracted into the hinge eyes 39.

The flanges 7 and 9 of the channel 3 are provided with a series of holes 47 for receiving the hinge pin portions 45 of the shelves for pivotally mounting each shelf for swinging movement about a horizontal axis at its rearward end, this axis being the axis of hinge pin portions 45 at the lower end of the rear flange 29 of the shelf. For each shelf, there is a pair of holes 47, one in flange 7, the other in flange 9, the holes being located closely adjacent the front edges of these flanges. In a typical commercial embodiment of the apparatus, there may be thirty-six pairs of holes for thirty-six shelves, in a channel 3 which is about three feet high, the holes being vertically spaced about thirteen-sixteenths of an inch (meaning that the shelves are closely spaced about thirteen-sixteenths of an inch). The shelves are very simply and readily assembled with the channel 3 by squeezing the sides 43a of the loop portion 43 of the wire hinge member 41 of each shelf to retract the hinge pins 45, entering the rear end portion of the shelf (including legs 35) between flanges 7 and 9, and allowing the hinge pins to spring out into the pair of holes 47 therefor. The legs 35 of the flange 29 of each shelf above the lowermost shelf extend down into the recesses 30 at the rear of the next shelf below for close spacing of the shelves.

The shelves, due to their weight, tend to swing downward on their hinge pins 45. Each shelf is adapted to be latched in the generally horizontal article-carrying position for the shelves shown in FIGS. 1–3 and 6–10 by its respective latch 25, the latter being adapted for release by the respective trip 27 to release the shelf to allow it to swing down for dispensing the article on the shelf. The latches and trips are all identical. As to each shelf, the respective latch and trip are pivoted for swinging movement on a common horizontal axis on a pin 49 extending horizontally between the flanges 17 and 19 of the auxiliary channel 13 at the rear of the shelf. The pins 49 are journalled in holes 51 in flanges 17 and 19 of channel 13.

Each latch 25, which may be molded of plastic, comprises a sleeve 51 mounted on the respective pin 49, with an arm 53 extending generally radially from the sleeve. This arm extends generally horizontally forward out of the auxiliary channel 13 in a vertical plane lying between the vertical planes of the lugs 31l and 31r on the rear flange 29 of the respective shelf. At its forward end, arm 53 has an upwardly and forwardly angled latch hook 55 formed with an inclined forward edge 57 which functions as a cam edge as will appear. This latch hook opens downward and has a rearwardly facing latching shoulder 59. Arm 53 also has a tongue 61 reaching forward below the hook 55 and having an upwardly extending forward end 63, forming an upwardly opening lower hook. The latch is biased to swing downward (counterclockwise as viewed in FIG. 3) by a torsion spring 65. The arrangement is such that, when a shelf is swung up to its horizontal article-carrying position, the top 43b of the loop of the wire hinge member 41 engages the cam edge 57 of the hook 55 at the forward end of the respective latch arm 53, and swings the latch arm upward to the point where element 43b is rearward of the shoulder 59, whereupon the latch arm 53, under the bias of spring 65, swings down for engagement of element 43b behind the shoulder 59 to latch the shelf in its generally horizontal article-carrying position.

Each trip 27, which may also be molded of plastic, comprises a sleeve 67 mounted on the respective pin 49, and rotatable with respect to the latch 25 on the pin. A trip arm 69 extends down from the sleeve 67. Trip arm 69 has a finger 71 for interengagement with the bottom of tongue 61 on the latch arm 53, and a lug 73 extending laterally toward the right below the pin 49 engaged by an end 65a of the torsion spring 65, with the arrangement such that trip arm 69 is biased by spring 65 to swing upward on pin 49 to tend to maintain trip finger 71 in engagement with the bottom of the tongue 61 on the latch arm 53. The single torsion spring 65 thus serves the dual purpose of biasing the latch arm 53 and the trip arm 69 to swing downward together about the axis of pin 49, the trip arm 69 being so downwardly biased via the engagement of the bottom of tongue 61 on the latch arm 53 with the finger 71 on the trip arm, and also biasing the trip arm 69 to swing upward to tend to maintain the interengagement of finger 71 and the bottom of latch arm tongue 61.

Each trip arm 69 (except for the lowermost trip arm) extends down from the respective pin 49 in front of the sleeve 67 of the trip 27 next below. Each trip arm above the lowermost trip arm is biased by the respective spring 65, acting through the respective latch arm 53, to swing down toward a fully retracted position determined by engagement of the trip arm with the sleeve 67 of the trip 27 next below. The lowermost trip arm 69 is biased by its spring 65, acting through the lowermost latch arm 53, to swing down toward a corresponding fully retracted position determined by engagement of the lowermost trip arm with a stop 75 constituted by a tongue struck from the web 15 of the secondary channel 13.

At its lower end, each trip arm 69 has a cam follower formation 77 on its left side adapted for engagement by one of a series of cam fingers 79 on a vertically shiftable release bar 81. This shift bar is mounted for vertical sliding movement between the left-hand flanges 7 and 17 of the main channel 3 and the auxiliary channel 13 by means of studs 83 projecting to the left from flange 17 through vertical slots 85 in the shift bar (see FIG. 13). The bar has a flange 87 at its forward edge extending to the right in front of the left-hand flange 17 of the channel 13. Cam fingers 79 project out from this flange 87 toward the left, spaced at intervals along the height of the bar corresponding to the spacing of the shelves. Each cam finger is initially formed to be of L-shape, and the vertical part of the L is bent over as indicated at 79a. The cam fingers lie in the vertical plane of the cam followers 77 on the trip arms 69.

Figures 1, 2:
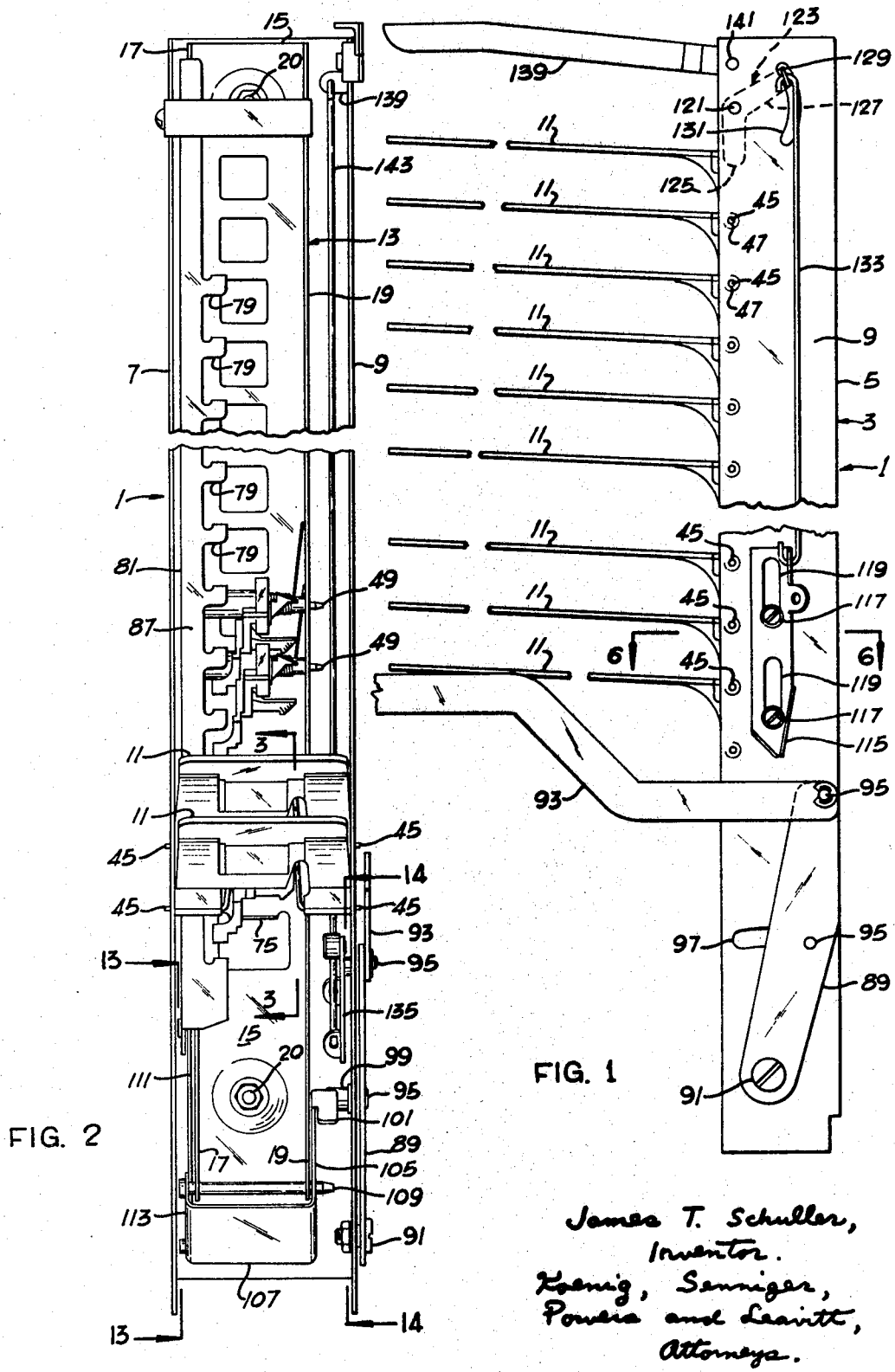
FIG. 1 is a side elevation of a drop-shelf column of this invention, broken away to reduce the height of the view.
FIG. 2 is a front elevation of FIG. 1.

The vertically shiftable release bar 81 normally occupies the lowered retracted position in which it appears in FIGS. 2 and 3. Means is provided for shifting the bar upward from its lowered retracted position and then back down to its retracted position to effect a dispensing operation involving operation of a trip 27 to release the respective latch 25 to release the respective shelf 11 to allow the shelf to swing down to dispense the article thereon. As shown in FIGS. 1, 2 and 14, this means comprises a lever 89 pivoted at 91 on the outside of the right-hand flange 9 of the main channel 3 adjacent the lower end of this channel. A rod 93 has its rearward end pivotally connected at 95 to the upper end of lever 89 and extends forward therefrom. Rod 93 is adapted to be pulled forward by means of a pull knob (not shown) on the front of the cabinet of the vending machine in which the apparatus of this invention is used, and to be returned rearward by spring means (not shown). Lever 89 carries a stud 95 extending inward through an arcuate slot 97 in flange 9 carrying a roller 99. This roller lies between flanges 101 and 103 at the upper end of a crank arm 105 at the right side of a crank 107 pivoted on a pin 109 mounted in the flanges 17 and 19 of channel 13 adjacent its lower end. A link 111 interconnects the left side 113 of the crank 107 and the lower end of bar 81, the arrangement being such that when rod 93 is pulled forward, lever 89 is swung forward to raise the bar 81, and on rearward return of the rod and lever 89, bar 81 is lowered.

When all the shelves 11 are latched in their generally horizontal article-carrying position by the hooking engagement of latch hooks 55 on latch arms 53 with the tops 43b of the loops of the wire hinge members 41 at the rear of the shelves, the trip arm 69 for the latch 25 for the lowermost shelf occupies the operative or trip position, in which it is shown in FIGS. 3 and 7–10, lying forward of its stop 75, wherein follower 77 at the lower end of the trip arm is located above the lowermost cam finger 79 on the release bar 81, in the path of movement of this finger for actuation of the lowermost trip arm the first time the release bar is moved upward. The lower most trip arm 69 is maintained in the stated operative or trip position by reason of the bias of end 65a of the torsion spring 65 on the trip arm causing the trip arm to swing upward to the point where finger 71 on the lowermost trip arm engages the bottom of tongue 61 on the lowermost latch arm 53 (see particuarly FIG. 8).

However, each of the trip arms 69 above the lowermost trip arm is maintained in a retracted position by reason of engagement of the left-hand lug 31l on the rearward end of each shelf (except the uppermost shelf) with the trip arm 69 for the shelf next above. Thus, referring to FIG. 9, it will be seen how lug 31l of the lowermost shelf (this shelf being in its article-carrying position) is in engagement with trip arm 69 for the second shelf up, holding the trip arm for the second shelf back in retracted position. Similarly, the lug 31l of the second shelf (when this shelf is in its article-carrying position) engages the trip arm 69 for the third shelf and holds it in retracted position, and so on up throughout the vertical series of shelves.

When the trip arms 69 above the lowermost trip arm are held back in retracted position by the next shelf below, the cam followers 77 at the lower ends of all these trip arms lie within the channel 13, clear of the cam fingers 79 on the vertically shiftable release bar 81. When the lowermost shelf 11 is released and swings down to dispense the article thereon, the trip arm 69 for the second shelf is released to swing out to its operative or trip position in the path of movement of the second cam finger 79 up from the lower end of bar 81 the next time the bar 81 is shifted upward. When the second shelf is released and swings down to dispense the article thereon, the trip arm 69 for the third shelf is released to swing out to its operative or trip position in the path of movement of the third cam finger 79 on bar 81 the next time bar 81 is shifted upward. The swing of each trip arm to its trip position occurs under the bias of the end 65a of the respective torsion spring 65, which, as above noted, is tending to swing the trip arm upward. The trip position of the trip arm is determined by engagement of finger 71 on the trip arm with the bottom of the tongue 61 on the respective latch arm 53. It will be observed that when the trip arm is in its retracted position, there is a separation of the finger 71 from the bottom of the tongue 61 on the respective latch arm (see FIG. 9), enabled by the fact that the trip arm is rotatable on the pin 49 relative to the latch arm against the bias exerted on the trip arm by spring 65.

Means is provided for locking the entire mechanism out of operation when the top shelf has been released. As shown in FIG. 1, this means comprises a latch 115 mounted for vertical sliding movement on the outside of flange 9 of channel 3 adjacent its lower end. The mounting of this latch is effected by means of screws 117 extending through vertical clots 119 in the latch and threaded in flange 9. Pivoted at 121 on the inside of the flange 9 of channel 3 adjacent its upper end is a bell crank lever 123. One arm 125 of this lever extends downward for engagement by the back of the flange of the top shelf when this shelf is in its raised article-carrying position (see FIG. 1). The other arm 127 of this lever extends rearward and has a finger 129 which projects laterally outward through an arcuate slot 131 in flange 9. A wire 133 connects finger 129 and the latch 115. When the top shelf is in raised position, the bell crank lever 123 is held in the position shown in FIG. 1 and acts through the wire 133 to hold the latch in the raised position shown in FIG. 1. When the top shelf is released, the bell crank lever is released and the latch slides down under its own weight into a position wherein it blocks the lever 89 from swinging forward, thereby locking the mechanism out of operation.

It will be understood a plurality of columns, such as above described, are mounted side-by-side in a vending machine cabinet (not shown) and that push-pull rods are provided which extend out of the front of the cabinet for actuating the rods 93 of the columns. In a typical vending machine in which the columns are used, access to the forward end of the lowermost shelf for raising it is blocked when this shelf is in its lowered position. Accordingly, means is provided for swinging the lowermost shelf back into its raised horizontal position which is readily accessible. As shown best in FIGS. 1, 2 and 14 this means comprises a lever 135 pivoted at 137 on the inside of the flange 9 of channel 3 toward the lower end of the channel. A lever 139 is pivoted at 141 on the inside of flange 9 toward the upper end of the channel. A wire 143 connects the levers 135 and 139. Lever 135 has a roller 145 for engaging the bottom shelf, the arrangement being such that by swinging lever 139 down, lever 135 is raised to raise the shelf.

Figure 9:
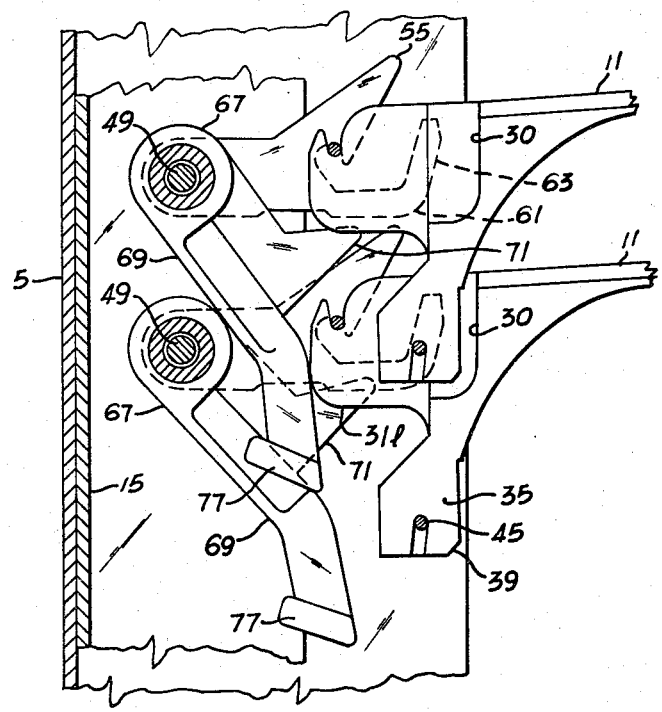
FIG. 9 is an enlarged detail section showing how the trip for the latch of a shelf is held in a retracted position by the next shelf below.

Operation is as follows:

Assuming that all the shelves 11 are latched in their raised generally horizontal article-carrying position, as illustrated in FIG. 1, by the engagement of hooks 55 of the latch arms 53 with the tops 43b of the loops 43 of the wires 41 on the rear of the shelves, the trip arms 69 for all the shelves, except the trip arm 69 for the lowermost shelf, occupy their retracted position such as is shown for the second shelf up in FIG. 9. The trip arm for the lowermost shelf occupies its trip position of FIGS. 7–10. It will be understood that each shelf will carry an article such as a candy bar to be dispensed. The first time the release bar 81 is raised and then lowered, by pulling the rod 93 forward and then returning it rearward, the bottom shelf 11 is released to swing downward by gravity to dispense the article thereon. Release of the bottom shelf 11 occurs as follows:

On upward movement of the release bar 81 from its lowered retracted position of FIG. 2, finger 79 on the bar 81 engages the rear of the cam follower 77 at the lower end of the trip arm 69 on the trip 27 for the latch 25 for the bottom shelf 11. This causes this trip arm to swing upward (clockwise as viewed in FIG. 10). The latch arm 53 of the latch for the bottom shelf swings upward in unison with the trip arm 69 via the engagement of finger 71 on the trip arm with the latch arm (see FIG. 11). The hook 55 at the forward end of the latch arm 53 disengages from the wire latching element 43b to release the bottom shelf, and the latter swings down to the intermediate slightly angled position shown in FIG. 11, determined by catching of the wire latching element 43b in the lower hook constituted by tongue 61 and its upward extension 63. The cam finger 79 for the lowermost trip 27 holds the lowermost trip and the lowermost latch arm 53 in the position shown in FIG. 11, maintaining the bottom shelf in its tilted FIG. 11 position until the release bar 81 is shifted back downward.

When the release bar 81 is shifted back downward, the spring 65 associated with the lowermost latch and trip biases the lowermost latch and trip to swing counterclockwise from their FIG. 11 to their FIG. 12 position. The lower hook 61, 63 on the latch thereupon clears the wire latching element 43b on the lowermost shelf, and the latter swings down to the depending position shown in FIG. 12, for dispensing the article carried on the lowermost shelf, this article sliding off the shelf and being delivered to the customer in a manner that will be apparent to those cognizant with the art.

It will be observed that on the upward shift of the bar 81 as above described to release the lowermost shelf, the trip arms 69 for all the shelves above the lowermost shelf are in their retracted position clear of all the fingers 79 above the lowermost finger 79. Consequently, none of the trips 27 above the lowermost trip are actuated, and only the lowermost shelf is released.

When the lowermost shelf is released and swings down to its FIG. 12. position, the lug 31l on the rear of this shelf swings away from the trip arm 69 for the latch 25 of the second shelf up, and this releases this trip arm 69 for swinging movement under the bias of end 65a of the respective spring 65 from its retracted position of FIGS. 3, 9 and 10 to its operative position of FIG. 12 wherein finger 71 on the trip arm engages the bottom of tongue 61 on the second latch up, and the cam follower 77 at the lower end of the second trip arm 69 is located above and in the path of the second cam finger 79 on the release bar 81. Then, the next time the release bar 81 is shifted up and back down, the second trip arm is swung by the second cam finger to trip the second latch 25 to release the second shelf.

The release of the second shelf conditions the trip for the third shelf to trip the latch for the third shelf on the next actuation of bar 81, the release of the third shelf conditions the trip for the fourth shelf to trip the latch for the fourth shelf on the next actuation of bar 81, and so on throughout the series of shelves up to and including the top shelf. Then, latch 115 locks out the apparatus from further operation.

The arrangement with the latches 25 and trips 27 mounted on pin 49 carried by the support constituted by channels 3 and 13, with the trips movable toward and away from engagement with the latches and biased toward engagement with the latches, and with the vertically shiftable release bar 81 with the series of trip-operating fingers 79, enables the close spacing of the shelves 11 via accommodation of legs 35 of each shelf above the bottom shelf in the recesses 30 at the rear of the next shelf below. Additionally, fewer parts are needed for a given number of shelves and assembly is facilitated.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Article dispensing apparatus of the class comprising a support, a plurality of shelves pivoted at one end on the support for swinging movement about horizontal axes located one above another and equally spaced, each shelf being adapted to occupy a generally horizontal article-carrying position and being swingable downward from this position to dispense the article thereon, with successive release of the shelves from the lowermost shelf up, and having improved means for latching the shelves in said article-carrying position and effecting successive release of the shelves, starting with the lowermost shelf, said means comprising:

a series of latches, one for each shelf, each mounted on said support for movement into and out of latching engagement with a respective shelf, and means whereby each latch is biased toward latching engagement with the respective shelf, a series of trips, one for each latch, each mounted on said support for movement toward and away from engagement with the respective latch, and means whereby each trip is biased toward engagement with the respective latch, a release bar carried by the support for vertical movement adjacent the trips, said bar having a series of vertically spaced trip-operating members, one for each trip, means for effecting vertical shifting of the bar away from and back to a retracted position, each shelf below the top shelf, when latched in its article-carrying position, being engageable with the trip for the latch of the next shelf above to hold this trip in a retracted position clear of the respective trip-operating member on the bar, each trip above the lowermost trip, on release of the next shelf below, being biased toward an operative position wherein it is engageable by the respective trip-operating member on the bar on the next actuation of the bar for movement by the bar to release the respective shelf, each shelf having a downwardly directed flange at its said one end and having its pivot axis at the lower end of said flange, the latch and trip for each shelf being located behind said flange, the latch and trip for each shelf each being pivoted for swinging movement on an axis behind said flange.

2. Article dispensing apparatus as set forth in claim 1 wherein spring means is provided for each latch and trip biasing the latch to swing in one direction on said common axis toward latching engagement with the respective shelf and the trip to swing in the opposite direction on said common axis toward engagement with the latch.

3. Article dispensing apparatus as set forth in claim 1 wherein said flange has a pair of legs extending downward at opposite sides thereof, the pivot axis of the shelf being at the lower ends of these legs, each shelf having recesses at its said end receiving the lower ends of the legs of the shelf next above.

4. Article dispensing apparatus as set forth in claim 3 wherein each shelf is pivoted on the support by means of a pivot member having hinge pin end portions extending through the legs received in holes in the support and a central portion engageable by the respective latch.

5. Article dispensing apparatus as set forth in claim 4 wherein said pivot member is a spring wire member bent to have a loop portion, and hinge pin end portions extending laterally from the ends of the loop portion, the sides of the loop portion being adapted to be squeezed together for retraction of said hinge pin portions, the latch being engageable with the central port of the loop portion.

6. Article dispensing apparatus as set forth in claim 1 wherein each shelf has a pair of lugs extending rearward from the flange, a latching element extending between said lugs, the latch and trip for each shelf being pivoted for swinging movement on a horizontal pin carried by the support behind the flange, each latch having a forwardly extending arm provided with a downwardly directed hook at its forward end for latching engagement with the latching element of the respective shelf, and wherein spring means is provided for biasing each latch to swing downward toward latching engagement with the respective latching element and for biasing the respective trip to swing upward toward engagement with the latch, one of the lugs on each shelf below the top shelf, when the shelves are latched in article-carrying position, being engageable with the trip for the latch of the next shelf below to hold this trip in retracted position clear of the respective trip-operating member on said bar.

7. Article dispensing apparatus as set forth in claim 6 wherein said bar is movable upward from and then back downward to its retracted position, and each trip has an arm engageable by the respective trip-operating member on said bar when the bar is shifted upward for swinging the trip upward to swing the latch upward.

8. Article dispensing apparatus as set forth in claim 7 wherein the flange of each shelf has a pair of legs extending downward at opposite sides thereof, each shelf being pivotally mounted on the support by means of a spring wire member bent to have a loop and hinge pin and portions extending laterally from the ends of the loop through the legs and received in holes in the support, the loop extending upward straddling the lugs on the back of the flange and its top portion constituting said latching element, the sides of the loop being adapted to be squeezed together for retraction of said hinge pin portions, each shelf having recesses at its flanged end receiving the lower ends of the legs of the shelf next above.

References Cited
UNITED STATES PATENTS

| | | | |
|---|---|---|---|
| 3,126,124 | 4/1964 | Katz et al. | 221—90 |
| 3,161,319 | 12/1964 | Holstein et al. | 221—90 |
| 3,167,215 | 1/1965 | Holstein et al. | 221—90 |
| 3,252,616 | 5/1966 | De Shon et al. | 221—90 |

WALTER SOBIN, *Primary Examiner.*